UNITED STATES PATENT OFFICE 2,137,042

CARBANILIC ACID ESTERS OF SUBSTITUTED ALKYLAMINOALKANOLS

Walter G. Christiansen, Glen Ridge, N. J., and Sidney E. Harris, Coral Gables, Fla., assignors to E. R. Squibb & Sons, New York, N. Y., a corporation of New York No Drawing. Application September 9, 1937, Serial No. 163,036

9 Claims. (Cl. 260—472)

This invention relates to, and has for its object the provision of, a novel group of esters of carbanilic acid, intermediates used in their preparation, and an advantageous method of preparing them. These esters have the general formula

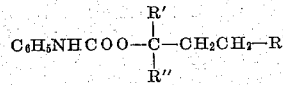

wherein R' represents hydrogen, alkyl, or alkylaminoalkyl, R represents hydrogen, alkyl, aryl, or aralkyl, and R'' represents alkylaminoalkyl. The invention also comprises the acid-addition salts of these esters. The compounds of this invention constitute valuable therapeutic agents, being particularly effective as local anesthetics.

In the practice of this invention, substituted alkyl carbanilates are prepared by reacting phenyl isocyanate with an alcohol of the formula

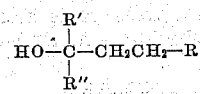

wherein R, R', and R'' have the above-noted signification.

The amino-esters of this invention are generally recovered in the form of their addition-salts with hydrochloric acid. However, other acids forming addition-salts with amines may be used in place of hydrochloric; such acids are boric, nitric, lactic, tartaric, citric, phosphoric, sulfuric, picric and picrolonic. The addition-salts may be converted to the free bases in the usual manner.

The following examples are illustrative of the invention:

EXAMPLE 1

Preparation of the carbanilate of α,α-di-(dimethylaminomethyl) - gamma - phenyl - propanol (mixture of the mono and di hydrochlorides)

2.4 g. of α,α-di(dimethylaminomethyl)-gamma-phenyl-propanol and 1.25 g. of phenyl isocyanate are mixed with 10 cc. of benzene and the mixture refluxed for four hours. After cooling the solution and adding an excess of alcoholic hydrochloric acid, the benzene and alcohol are distilled off in vacuo, leaving a residue. This residue is dissolved in water and treated with sodium carbonate solution; the free base which separates is extracted with ether, and the ether solution decolorized by treatment with carbon and filtering. The purified ether solution is treated with one equivalent of alcoholic HCl, whereupon a precipitate consisting of a mixture of the mono and di-hydrochlorides is formed. The precipitate is filtered off, washed with ether and dried in vacuo. It is a white, hygroscopic, crystalline solid, melting at 160–161° C. with decomposition, is soluble in water and alcohol, and insoluble in ether.

The alcohol reactant used in Example 1 is prepared as follows:

(A) 3.78 g. magnesium turnings are covered with dry ether and warmed. 29.1 g. phenylethyl bromide dissolved in 35 cc. dry ether is then added at such a rate that the ether refluxes without applying external heat. When the magnesium disappears, the reaction vessel is cooled by a freezing mixture, and a solution of 20 g. of symmetrical dichloroacetone in 50 cc. dry ether is added dropwise while agitating well. After standing overnight, the reaction mixture is poured into ice cold dilute sulfuric acid. The ether layer is separated, washed with water, dried with anhydrous sodium sulfate, and the ether distilled off. The residual oil is distilled under reduced pressure and the fraction boiling at 130–138° C. at 4 mm. pressure is collected; it is α,α-di-(chloromethyl)-gamma-phenyl-propanol.

(B) 16.5 g. of the alcohol thus produced and a solution of 10 g. dimethylamine in 50 cc. benzene are mixed and heated in a sealed tube for seven hours at 140° C. The reaction mixture is cooled, treated with water, and made alkaline with sodium hydroxide. The separating oil is extracted with ether, washed with water and dried with sodium sulfate. After distilling off the ether, the residue is distilled in vacuo, and a fraction boiling at 153–154° C. at 5 mm. pressure is collected. This product is substantially pure α,α-dy-(dimethylaminomethyl)-gamma-phenyl-propanol.

EXAMPLE 2

Preparation of the hydrochloride of the carbanilate of α - methyl - α - dimethylaminomethyl-gamma-phenyl-propanol 11.2 g. of α-methyl-α-dimethylaminomethyl-gamma-phenyl-propanol, 6.2 g. phenyl isocyanate, and 40 cc. of benzene are refluxed together for two hours. A solution of HCl in absolute alcohol is then added and the mixture cooled. On adding anhydrous ether, the desired hydrochloride is precipitated; it is filtered off, washed with ether, and dried in vacuo. The compound is a white crystalline solid melting at 171–172° C.

(corrected), is soluble in water and alcohol, and insoluble in ether.

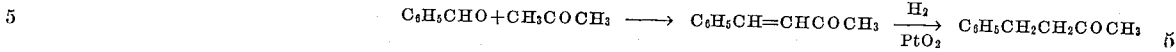

The alcohol reactant used in Example 2 may be prepared as follows:

46 g. phenylethyl bromide, 6 g. of magnesium turnings and 23 g. of monochloroacetone are reacted in dry ether in the manner detailed in Example 1 (Section A). The fraction boiling at 112–119° C. at 3 mm. pressure is collected; it is α-methyl-α-chloromethyl-gamma-phenyl propanol.

23 g. of the alcohol thus produced is mixed with 40 cc. of a 25% solution of dimethylamine in benzene and heated at 125–140° C. for six hours. The reaction product is further treated in the manner detailed in Example 1 (Section B). The product boiling at 128° C. at 5 mm. pressure is collected. It is substantially pure α-methyl-α-dimethylaminomethyl-gamma-phenyl-propanol.

Example 3

In a manner similar to that detailed in Examples 1 and 2, phenyl isocyanate may be reacted with α-methyl-α-diethylaminoethyl-n-propanol to form the corresponding ester. The alcohol reactant may be prepared by either of two methods:

(a) β-diethylaminoethyl chloride is converted into a Grignard reagent which is reacted with methyl ethyl ketone.

(b) Methyl-β-chloroethyl-ketone is treated with ethyl magnesium bromide, and the resulting product reacted with diethylamine.

Example 4

In a manner similar to that detailed in Examples 1 and 2, phenyl isocyanate may be reacted with α-methyl-α-dimethylaminomethyl-delta-phenyl-butanol to form the corresponding ester. The alcohol may be prepared by reacting monochloroacetone with gamma-phenyl-propyl magnesium bromide, and treating the reaction product with dimethylamine.

Example 5

Phenyl isocyanate may be reacted with α-diethylaminomethyl-gamma-phenyl-propanol to form the corresponding ester in the manner indicated in Examples 1 and 2. The alcohol reactant may be prepared by either of two methods:

(a) β-diethylamino-acetaldehyde is reacted with β-phenyl-ethyl magnesium bromide.

(b) β-chloroacetaldehyde is reacted with β-phenyl-ethyl magnesium bromide, and the reaction product is treated with diethylamine.

Example 6

Phenyl isocyanate may be reacted with α-methyl-α-dimethylaminoethyl-gamma-phenyl-propanol to form the corresponding ester, in the manner indicated in Examples 1 and 2. The alcohol used may be prepared by either of two methods:

(a) β-chloroethyl-methyl-ketone is reacted with β-phenyl-ethyl magnesium bromide, and the reaction product is treated with dimethylamine.

(b) Benzyl acetone is reacted with β-dimethyl-amino-ethyl magnesium chloride.

The benzyl acetone may be easily prepared by reacting benzaldehyde with acetone, and catalytically hydrogenating the reaction product, using platinum oxide as the catalyst (in the absence of a ferrous sulfate promoter).

Example 7

Phenyl isocyanate may be reacted with α-methyl-α-dimethylaminomethyl-n-pentanol to form the corresponding ester, in the manner indicated in Examples 1 and 2. The alcohol may be prepared as follows:

12 g. magnesium turnings is covered with dry ether and treated with 70 grams n-butyl bromide in 100 cc. dry ether. The Grignard reagent thus produced is cooled in an ice-salt mixture and treated dropwise with 35 g. monochloroacetone which has been dissolved in an equal volume of dry ether. On pouring the reaction mixture into a mixture of ice and dilute sulfuric acid, an ether layer separates, and the aqueous layer is then extracted with 100 cc. ether. The combined ether solutions are dried by means of anhydrous sodium sulfate, and the ether distilled off. The residue is distilled in vacuo and redistilled at ordinary pressure. The product, which boils at 180–183° C., is α-methyl-α-chloromethyl-n-amyl alcohol.

32 g. of this alcohol is mixed with a solution of 25 g. dimethylamine in 50 cc. benzol and heated to 130–140° C. for 8 hours. The mixture is then treated with water and an excess of HCl. The benzene solution is extracted with dilute hydrochloric acid, and the combined hydrochloric acid solutions are evaporated almost to dryness. The residue is treated with concentrated aqueous NaOH and extracted with ether until all of the nitrogenous material has been removed. The ether is distilled off and the residue distilled in vacuo. The colorless liquid recovered, boiling at 78–71° C. at 10 mm. pressure, is substantially pure α-methyl-α-dimethylaminomethyl-n-amyl alcohol.

Example 8

Phenyl isocyanate may be reacted with α,α-di(dimethylaminomethyl)-n-pentanol to form the corresponding ester, in the manner indicated in Examples 1 and 2. The alcohol reactant may be prepared as follows:

53 g. n-butyl bromide is treated with 9 g. magnesium turnings in dry ether; the solution is cooled and treated dropwise with 35 g. symmetrical dichloroacetone. The reaction mixture is poured into a mixture of ice and dilute sulfuric acid. The ether layer formed is separated, washed with water and dried with anhydrous sodium sulfate. After distilling off the ether, the residue is distilled in vacuo and a fraction boiling at 75–100° C. at 18 mm. pressure collected. This product is α,α-di(chloromethyl)-n-amyl alcohol.

17.5 g. of this alcohol is mixed with a solution of 25 g. dimethylamine in 50 cc. benzene and heated in a sealed vessel at 140° C. for 6½ hours. The mixture is then treated with dilute hydrochloric acid, and the benzene layer extracted with a second portion of dilute hydrochloric acid. The combined acid solution is then evaporated to dryness, treated with solid sodium hydroxide, and exhaustively extracted with ether. The ether is distilled from the extract and the residue distilled in vacuo. The colorless oil obtained, boiling at 92° C. at 9 mm. pressure, is substantially pure α,α-di(dimethylaminomethyl)-n-amyl alcohol.

Among the other alcohols which may be reacted with phenyl isocyanate to form the corresponding esters are α,α-di(dimethylaminomethyl)-n-propanol and α-methyl-α-diethylaminomethyl-n-propanol.

The invention may be variously otherwise embodied, within the scope of the appended claims.

We claim:

1. Substituted alkyl carbanilates of the class consisting of

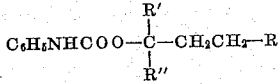

wherein R' is a member of the group consisting of hydrogen, alkyl, and alkylaminoalkyl, R is a member of the group consisting of hydrogen, alkyl, aryl and aralkyl, and R'' is alkylaminoalkyl, and their acid-addition salts.

2. The hydrochlorides of substituted alkyl carbanilates of the formula

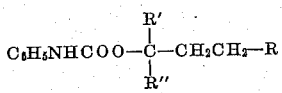

wherein R' is a member of the group consisting of hydrogen, alkyl, and alkylaminoalkyl, R is a member of the group consisting of hydrogen, alkyl, aryl and aralkyl, and R'' is alkylaminoalkyl.

3. The hydrochlorides of substituted alkyl carbanilates of the formula

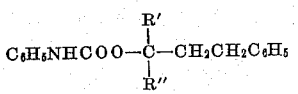

wherein R' is a member of the group consisting of hydrogen, alkyl and alkylaminoalkyl, and R'' is alkylaminoalkyl.

4. A hydrochloride of the carbanilate of an α-R'-α-dimethylaminomethyl-gamma-phenyl-propanol, wherein R' is a member of the group consisting of hydrogen, alkyl and alkylaminoalkyl.

5. A hydrochloride of the carbanilate of α,α-di(dimethylaminomethyl)-gamma-phenyl-propanol.

6. The hydrochloride of the carbanilate of α-methyl-α-dimethylaminomethyl-gamma-phenyl-propanol.

7. The carbanilate of α,α-di-(dimethylaminomethyl)-n-pentanol.

8. The process of preparing a member of the group consisting of substituted alkyl carbanilates and their acid-addition salts which comprises reacting phenyl isocyanate with an alcohol of the formula

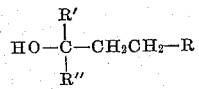

wherein R' is a member of the group consisting of hydrogen, alkyl, and alkylaminoalkyl, R is a member of the group consisting of hydrogen, alkyl, aryl, and aralkyl, and R'' is alkylaminoalkyl.

9. The process of preparing a member of the group consisting of substituted alkyl carbanilates and their acid-addition salts which comprises refluxing a mixture of phenyl isocyanate, benzene, and an alcohol of the formula

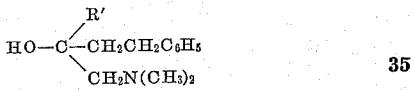

wherein R' is a member of the group consisting of hydrogen, alkyl and alkylaminoalkyl.

WALTER G. CHRISTIANSEN.
SIDNEY E. HARRIS.